Figure 1:
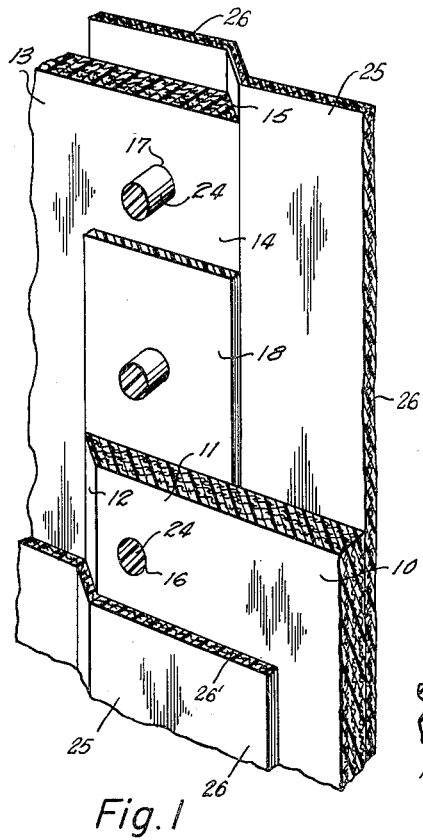

May 29, 1962 J. F. GIBB 3,036,728
METHODS AND MEANS FOR FORMING JOINTS IN VESSELS
Filed Aug. 16, 1956

INVENTOR
John F. Gibb

BY *Ashley & Ashley*

ATTORNEYS

United States Patent Office 3,036,728
Patented May 29, 1962

3,036,728
METHODS AND MEANS FOR FORMING JOINTS IN VESSELS
John F. Gibb, Tulsa, Okla., assignor to National Tank Company, Tulsa, Okla., a corporation of Nevada
Filed Aug. 16, 1956, Ser. No. 604,414
2 Claims. (Cl. 220—75)

This invention relates to new and useful improvements in methods and means for forming joints in vessels.

The invention is particularly concerned with the forming of bonded joints in vessels fabricated of sheets of synthetic resin having reinforcing laminae embedded therein and extending coplanarly with the sheets.

It is often desirable to form a tank, vessel, or other enclosure of plastic or synthetic resinous materials in order to take advantage of the corrosion resistance and other inherent properties of such materials. Often, however, the vessels are of such size or configuration that they may not be formed of one piece of material, but instead, must be fabricated from a plurality of sheets of the synthetic resin, usually reinforced with layers of glass cloth or other suitable material. It is quite possible to employ conventional fabrication practices and utilize an overlapping bolted joint for joining the marginal portions of the vessel sheets as currently practiced in the fabrication of steel tanks and vessels, but such a structure exposes metal elements to the contents of the vessel and limits the corrosion resistance thereof. The use of bolts and other metal elements formed of corrosion resisting steel reduces this problem somewhat, but even these alloys have their limitations of use and are not always satisfactory, in addition to which, the expense of the structure is considerably increased.

It is also the practice to employ glass fibers or glass cloth as the reinforcing material in the resin sheets, glass fibers having been found very strong and durable and most suitable for this purpose. There are instances, however, in which the contents of the tank or vessel attack the glass fibers directly, and the desired stability for the vessel walls is not obtained. Even though some suitable surfacing material be placed on the inner faces of the sheets from which the vessel is made, the edge portions of the sheets are necessarily exposed, permitting access of the vessel contents to the reinforcing glass fibers thus exposed at the sheet edges.

It is, therefore, one object of this invention to provide improved methods and means of fabricating vessels of reinforced synthetic resin sheets by providing a unique and durable joint structure and a method of fabricating the same.

It is a further object of the invention to provide methods and means of a character described in which the possibility of attack of the reinforcing fibers within the resin sheets is eliminated.

Yet a further object of the invention is to provide improved method and means for producing a unique bonded joint between the overlapping margins of synthetic resin sheets in which the tendency of the sheets to delaminate under stress is eliminated.

Other and more particular objects of the invention will be apparent from a reading of the following description and the claims appended hereto.

A construction designed to carry out the invention will be hereinafter described, together with other features of the invention.

Figure 4:
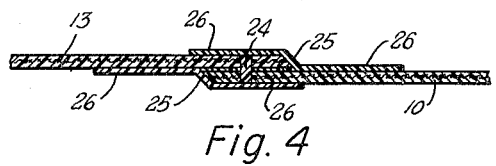
Figure 2:
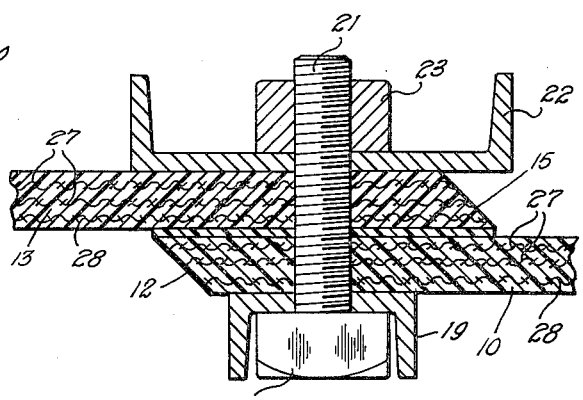
Figure 3:
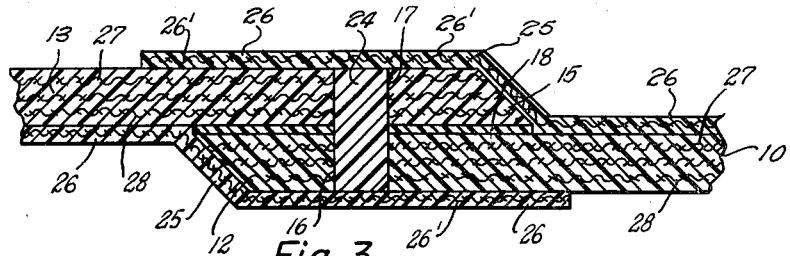

The invention will be more readily understood from a reading of the following specification and by reference to the accompanying drawing, wherein an example of the invention is shown, and wherein:

FIG. 1 is a fragmentary view in perspective of a joint constructed in accordance with this invention and illustrating the methods hereof, the view being broken away to illustrate the structure, FIG. 2 is an enlarged, cross-sectional view illustrating an intermediate stage in the fabrication of the joint, FIG. 3 is an enlarged, cross-sectional view of the completed joint, and FIG. 4 is a view similar to FIG. 3 but on a reduced scale to illustrate a larger portion of the joint structure.

In the drawings, the numeral 10 designates one stave or sheet of a tank or vessel structure, having a margin or marginal portion 11 terminating in a bevelled edge 12. A second stave or sheet 13 of the vessel has a marginal portion 14 in abutting and overlapping arrangement with the portion 11 and terminating in a bevelled edge 15. The sheet 10 is provided with a plurality of spaced openings 16 in its marginal portion registering or alined with a row of similar spaced openings 17 in the marginal portion of the sheet 13.

In the fabrication of the joint, a layer 18 of bonding material is applied to either or both of the adjoining faces of the marginal portions 11 and 14, and the faces pressed together with the openings 16 and 17 in registry. Any suitable synthetic resinous adhesive, cement, or other material may be employed for forming the bonding layer 18, it having been found desirable to employ an uncured resin similar or identical to that from which the sheets 10 and 13 are formed, but any suitable cement or adhesive may be employed as found desirable. The bonding material may be air drying or curing, or may require the application of heat and/or pressure for curing or setting to form a completed joint in which the sheets have their marginal portions bonded together. The epoxy resins are well known for their cementing or adhering properties, and have been found quite suitable for this purposes. The epoxy resins are the condensation product of epichlorohydrin and bis-phenol, and are readily available on the open market under the identification of epoxy resins.

For holding the marginal portions of the sheet in tight engagement until the joint has cured or set, a conventional, apertured channel 19 of steel may be positioned upon one side of the joint and receive the heads 20 of a plurality of bolts having their shanks 21 extending through the alined apertures 16 and 17 and through a somewhat wider channel 22 positioned upon the opposite side of the joint. Then, by applying nuts 23 to the exposed shanks 21, the nuts may be tightened upon the bolts to draw the joint tightly together, the channels 19 and 22 functioning as stiffening members to form the joint to the desired configuration as well as to force the portions of the sheets between the bolt openings into snug and tight engagement.

The joint is now allowed to cure or set by the passage of time, by air drying, by heat and/or pressure curring, or by the application of whatever other external conditions may be required for setting or curing of the bonding material 18. Following completion of the joint, the nuts and bolts are removed, and the channel members 19 and 22 taken from the bonded joint.

Now, the alined bolt openings 16 and 17 may be filled with any suitable cement, adhesive, mastic, or other material as shown at 24 in FIGS. 1 and 3. Here again, it is desirable to use a synthetic resin similar or identical to that from which the sheets 10 and 13 are formed, or to use a resin of marked adhesive qualities such as one of the epoxy resins previously mentioned. Following this step, a thoroughly bonded and impervious joint has been provided.

It is to be noted, however, that the application of stresses to the sheets 10 and 13 transverse to the longitudinal axis of the joint 24 will result in vector forces tending to cause the sheets to peel or delaminate at their edge portions 12 and 15, thus sometimes causing first a planar failure or shearing of the sheet followed by complete rupture or failing of the joint. To overcome this objection, as well as to solve other problems to be described hereinafter, a layer of reinforcing material is applied upon each side of the joint to bridge the edge portions of the sheets and provide a reinforcing element extending between the surfaces of the sheets on each side of the joint proper.

As shown in FIGS. 1 and 3, the layer 25 of reinforcing material extends longitudinally of the joint abutting the bevelled edge 12 on one side of the joint, and the opposite layer abutting the bevelled edge 15 upon the opposite side of the joint. Each of the layers is provided with lateral marginal portions or flaps 26 which extend an appreciable distance over the surfaces of the sheets 10 and 13, and thus function to transfer stresses from the sheet 10 to the sheet 13 at right angles to the joint without creating vector forces tending to delaminate the edge portions of the sheets. The reinforcing layer 25 desirably consists of a layer 26′ of reinforcing fabric or other material applied to and bonded to the edge portions of the sheets and the adjoining surfaces of the sheets with any suitable adhesive, cement, or bonding material, it again being desirable to use a material similar to that employed for the bonding layer 18.

By this means, a very strong and rigid joint is obtained and the presence of all metal is eliminated. At the same time, a continuous and relatively homogeneous surface is presented both exteriorly and interiorly of the tank or vessel, the edge portions of the sheets, and the reinforcing fibers exposed therein, are completely and thoroughly covered, and the tendency of the joint to fail by delamination is eliminated.

There are instances in which the materials to be contained within a vessel may adversely affect glass or glass fibers, and hence, the use of glass rovings or glass fabric as a reinforcing material in the sheets 10 and 13 is not always satisfactory. These sheets are formed of a plurality of layers of glass rovings or fabric impregnated with a suitable resin and pressed into a sheet under heat and considerable pressure. In this process, some fibers of the glass reinforcing material may be exposed at the surface of the sheet due to the pressing of resin from the fibers, and it is virtually impossible to avoid the exposure of the glass fibers at the edge portions of the sheets. Thus, not only at the edge portions, but even in intermediate portions of the sheets, glass fibers may be exposed to the harmful effects of the tank contents.

To overcome this problem, the outer layers 27 of the reinforcing rovings or fabric in the sheets 10 and 13 may be formed of glass fibers to utilize the considerable strength and other advantages of such fibers. The innermost layer 28 of each sheet is, however, constituted of a suitable organic or inorganic material not subject to attack by the material being contained, such as asbestos, nylon, cotton fibers or fabric, or the fibrous materials readily available and known commercially as synthetic resin cloth or synthetic resin rovings. The latter are synthetic resins of varying properties which resist many of those substances by which glass fibers may be attacked or otherwise deleteriously affected.

Thus, the innermost layer of reinforcing material in the sheets 10 and 13 is formed of a material not attacked by the same chemicals or fluids as the glass fibers, and functions as a barrier to protect the glass fibers against attack through the surface of the sheets 10 and 13. Similarly, for protecting the edge portions of the sheets, the reinforcing 26′ of the layer 25 is desirably formed of the same material as the reinforcing layer 28, and thus, a barrier is provided at the exposed edges of the sheets 10 and 13 to isolate the exposed glass fibers at such edges from the vessel contents and prevent the latter material from reaching the glass fibers for adverse effect thereon. At the same time, all of the physical and structural advantages previously pointed out as resulting from this joint and its method of fabrication, are obtained.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a vessel formed of sheets of synthetic resin, each sheet having embedded therein a plurality of reinforcing laminations extending coplanarly with the sheets and characterized by being subject to delamination internally of the individual sheets between adjacent laminae, a joint between adjoining sheets positioned in overlapping relationship with exposed edges, a layer of bonding material between the overlapping marginal portions and bonding said portions together in overlapping relationship, and a layer of reinforcing material superposed on and bonded to each face of the joint, each layer extending longitudinally of the joint over and in sealing contact with the entire exposed sheet edge on the side of the joint and being of sufficient width to extend an appreciable distance over the faces of the sheets on each side of said exposed edge.

2. In a vessel formed of sheets of synthetic resin having embedded therein reinforcing laminae extending coplanarly with the sheets and characterized by being subject to delamination internally of the individual sheets between adjacent laminae, a joint between adjoining sheets positioned in overlapping relationship with exposed edges, a layer of bonding material between the overlapping marginal portions and bonding said portions together in overlapping relationship, and a layer of reinforcing material superposed on and bonded to each face of the joint, each layer extending longitudinally of the joint over the exposed sheet edge on the side of the joint and being of sufficient width to extend an appreciable distance over the faces of the sheets on each side of said exposed edge, the innermost reinforcing laminae and the innermost layer of reinforcing material being formed of non-vitreous fibers, and the outer reinforcing laminae being formed of vitreous fibers.

References Cited in the file of this patent

UNITED STATES PATENTS

| | | |
|---|---|---|
| 1,560,712 | Naylor | Nov. 10, 1925 |
| 1,662,018 | Van Orman | Mar. 6, 1928 |
| 1,722,324 | Deming | July 30, 1929 |
| 2,273,154 | Strasmoe | Feb. 17, 1942 |
| 2,317,734 | Cook | Apr. 27, 1943 |
| 2,321,777 | Schelhammer et al. | June 15, 1943 |
| 2,372,983 | Richardson | Apr. 3, 1945 |
| 2,420,421 | Eason | May 13, 1947 |
| 2,422,725 | Gilfillan | June 24, 1947 |
| 2,439,562 | Cunningham | Apr. 13, 1948 |
| 2,520,737 | Romeyn et al. | Aug. 29, 1950 |
| 2,650,184 | Biefeld | Aug. 25, 1953 |
| 2,679,305 | Gunthrop | May 25, 1954 |
| 2,698,273 | Miner et al. | Dec. 28, 1954 |
| 2,703,109 | Saville | Mar. 1, 1955 |
| 2,710,113 | Pritchard | June 7, 1955 |
| 2,726,222 | Palmquist | Dec. 6, 1955 |
| 2,739,829 | Pedlow et al. | Mar. 27, 1956 |
| 2,746,891 | Doane | May 22, 1956 |
| 2,795,264 | Pechy | June 11, 1957 |
| 2,799,610 | Magill | July 16, 1957 |

FOREIGN PATENTS

| | | |
|---|---|---|
| 559,113 | Germany | Sept. 16, 1932 |
| 658,356 | Great Britain | Oct. 10, 1951 |